(12) United States Patent
Mehrl et al.

(10) Patent No.: US 11,336,944 B2
(45) Date of Patent: May 17, 2022

(54) METHOD FOR CONTROLLING A DISPLAY PARAMETER OF A MOBILE DEVICE AND COMPUTER PROGRAM PRODUCT

(71) Applicant: ams International AG, Rapperswil (CH)

(72) Inventors: David Mehrl, Plano, TX (US); Greg Stoltz, Flower Mound, TX (US)

(73) Assignee: AMS INTERNATIONAL AG, Rapperswil (CH)

( * ) Notice: Subject to any disclaimer, the term of this patent is extended or adjusted under 35 U.S.C. 154(b) by 274 days.

(21) Appl. No.: 16/611,993

(22) PCT Filed: May 9, 2018

(86) PCT No.: PCT/EP2018/062091
§ 371 (c)(1),
(2) Date: Nov. 8, 2019

(87) PCT Pub. No.: WO2018/206691
PCT Pub. Date: Nov. 15, 2018

(65) Prior Publication Data
US 2020/0204853 A1    Jun. 25, 2020

Related U.S. Application Data

(60) Provisional application No. 62/504,878, filed on May 11, 2017.

(30) Foreign Application Priority Data

Jun. 8, 2017  (EP) ..................................... 17175074

(51) Int. Cl.
*H04N 21/41*  (2011.01)
*G09G 5/10*  (2006.01)
(Continued)

(52) U.S. Cl.
CPC ..... *H04N 21/41407* (2013.01); *G06V 40/165* (2022.01); *G09G 5/10* (2013.01);
(Continued)

(58) Field of Classification Search
CPC combination set(s) only.
See application file for complete search history.

(56) References Cited

U.S. PATENT DOCUMENTS 5,854,661 A   12/1998  Kochanski
6,596,981 B1   7/2003  Aswell et al.
(Continued)

FOREIGN PATENT DOCUMENTS

CN   106357904 A   1/2017

OTHER PUBLICATIONS

European Search Report, International Search Report for PCT/EP2018/062091 dated Aug. 9, 2018.

*Primary Examiner* — Wesner Sajous
(74) *Attorney, Agent, or Firm* — MH2 Technology Law Group LLP

(57) ABSTRACT

A method is proposed for controlling a display parameter of a mobile device. The mobile device comprises a display and a first imaging unit. The method comprising the step of positioning and orienting the display with respect to a reference plane located at a reference position, such that the first imaging unit faces towards the reference plane. Then a first image is generated by means of the first imaging unit, wherein the first image depends on ambient light incident on the first imaging unit and emitted from at least one ambient light source. A first light level is calculated from the first image, wherein the first light level is indicative of a first fraction of the incident ambient light which illuminates the reference plane by means of specular reflection of the
(Continued)

incident ambient light at the display. Finally, the display parameter is adjusted depending on the first light level.

15 Claims, 4 Drawing Sheets

(51) Int. Cl.
  *H04N 21/422* (2011.01)
  *H04N 21/431* (2011.01)
  *G06V 40/16* (2022.01)
  *H04N 21/414* (2011.01)
  *H04N 21/4223* (2011.01)

(52) U.S. Cl.
  CPC ... *H04N 21/4223* (2013.01); *H04N 21/42202* (2013.01); *H04N 21/4318* (2013.01); *G09G 2320/0666* (2013.01)

(56) References Cited

U.S. PATENT DOCUMENTS

| 2012/0081279 | A1 | 4/2012 | Greenbaum |
| 2013/0082607 | A1* | 4/2013 | Gandhi ............... G09G 3/3433 315/153 |
| 2014/0240828 | A1* | 8/2014 | Robinson ............... G06F 3/012 359/465 |
| 2015/0091792 | A1 | 4/2015 | Koo |
| 2015/0145883 | A1 | 5/2015 | Marti |
| 2015/0154919 | A1 | 6/2015 | Ooshima |
| 2015/0187258 | A1 | 7/2015 | Lee |
| 2016/0360167 | A1* | 12/2016 | Mitchell ............. H04N 9/3194 |
| 2017/0085867 | A1* | 3/2017 | Baran ................. H04N 13/302 |
| 2017/0310940 | A1* | 10/2017 | Perdices-Gonzalez ..................... G09G 3/2096 |

\* cited by examiner

METHOD FOR CONTROLLING A DISPLAY PARAMETER OF A MOBILE DEVICE AND COMPUTER PROGRAM PRODUCT

This invention relates to a method for controlling a display parameter of a mobile device and further relates to a computer program product.

BACKGROUND OF THE INVENTION

Ambient Light Sensing (ALS) devices approximate the human eye response to light under a variety of lighting conditions, e.g. to mimic photopic or scotopic vison. The ALS detection is useful for display management, dimming or brightness control with the purpose of reducing power consumption, extending battery life, and providing an optimum viewing in diverse lighting conditions, for example. Existing ALS detectors are typically implemented in various mobile devices and detect light from a wide range of angles. Many mobile devices are equipped with displays that employ smooth clear glass. The displays, however, often create a specular, mirror-like reflection component. This so called screen "glare" is often a significant but unwanted contributor to light reaching the user's eyes. On the other side, present day ALS detectors do not attempt to distinguish between this, often dominant, specular reflection component and the rest of the light reaching the ALS detector.

The user typically sees the display screen in his central field-of-view with the glare superimposed. In addition, the user sees the surrounding areas, outside of the display screen, in his peripheral vision. ALS detectors are often designed with a wide angular field-of-view facing towards the user (considered a backward facing detector hereinafter).

Thus, such an ALS detector may detect light from bright sources such as the Sun, a ceiling can light or the blue sky. This can create errors because the user typically is facing the opposite direction (with respect to backward facing detector, considered forward facing hereinafter). As a consequence the user's field-of-view may be markedly different than the field-of-view of the backward facing detector for ALS.

FIG. 7 shows exemplary specular reflection paths at the display of a mobile device. The mobile device 1 comprises a display 10 and an ambient light sensor 11 arranged behind, or in proximity, to the display. Typically, the mobile device is held by a user (not shown) such that the display and the ambient light sensor face towards the user's eye (represented as a reference plane RP in the drawing). This position and orientation will be considered a reference position hereinafter.

An ambient light source such as a bright ceiling can light or the Sun (depicted as a point source PS in the drawing) can produce a bright glare off of the display, and the user will generally reorient the device into a position, such as the in the reference position shown in the drawing, without even thinking about it, so that this specular reflection does not shine into his or her eyes. Rays R1 and R2 indicate light incident from the point source PS. These rays are specularly reflected from the display 10 as rays R3 and R4, respectively, and may not reach the user's eye in this case. However, the typical ambient light sensor 11 will still see strong light components due to its large, back-facing, angular field-of-view. Thus, the ambient light sensor 11 may then overcompensate by making the display 10 excessively bright.

For example, as shown in FIG. 7, in other situations, bright intense off-axis light may have little impact on the viewer as the specular reflection from the display 10 misses the viewer's eyes (the user's field-of-view is indicated as dashed lines in the drawing). In conclusion, in certain situations bright light from point-like sources may saturate a common ambient light sensor while little or none of that light reaches the user's eye(s) (at reference plane RP). This may result in that the display brightness is overcompensated, degrading the user experience, and wasting cell phone battery reserve by unnecessarily over-brightening the display.

SUMMARY OF THE INVENTION

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the method for controlling a display parameter of a mobile device and from the computer program product as defined in the accompanying claims.

An improved concept for controlling a display parameter of a mobile device and a computer program product will be described hereinafter. The proposed concept allows improved control of display parameters such as display brightness and/or color. The concept involves means to estimate a field-of-view illumination, e.g. of a person using the mobile device, by utilizing information on ambient light or a combination of information from different sources that contribute to light being incident on the mobile device. The concept makes use of one or more light detectors, such as forward and backward looking sensors, e.g. a backward or forward facing cameras that exists in most modern mobile devices such as smart phones or tablets.

Information from multiple sources can be used including information from a forward looking camera, information from a backward looking camera and information from a backward looking ambient light sensor (ALS). On aspect of the proposed concept is to fuse this information to more accurately estimate the light levels (and in some cases, also the color content) that reaches the user's eyes. In other words in some embodiments the proposed concept allows for reconstructing illumination at the location of a user's eye. This is may be the next best thing to locating a sensor that detects an estimate of what the user sees.

The proposed concept not only allows for estimating a total photopic energy as integrated over the user's field-of-view, but also allows for detecting a portion of the light that is specularly reflected from the display screen, e.g. as "screen glare", in the direction of the viewer's eyes. In many cases, this specularly reflected light has a disproportionately large effect on the viewer that requires a larger increase in the display brightness in order to adequately compensate. This is because the glare is directly superimposed on the screen image that the viewer is attempting to view. This provides for a better viewer experience when using the mobile display in an environment with diffuse, yet bright light that is specularly reflected from the mobile screen (such as blue sky, which can be very bright indeed).

In at least one embodiment of a method for controlling a display parameter of a mobile device, the mobile device comprises a display and a first imaging unit. The mobile device may be any electronic device which has a display, such as a mobile phone, smartphone or tablet, etc. The imaging unit may comprise a light sensor such as a CCD or CMOS photo sensor, or any other optical sensor that detects and conveys information that constitutes an image. The term "imaging unit" indicates that the light sensor may be equipped with additional components such as optics, optical lenses, a processor, control electronics and the like. However, just a single light image sensor also qualifies for an imaging unit. The imaging unit generates one or more images each having a finite set of image values, e.g. pixels.

The method involves positioning and orienting the display with respect to a reference plane. The reference plane is located at a reference position such that the first imaging unit faces towards the reference plane. For example, a user's eye can be considered the reference plane. In this case the retina constitutes a planar light sensitive area which defines a certain field-of-view. In addition, the field-of-view can be altered by means of an optical lens, such as the lens of the user's eye. However, the reference plane could be any other type of plane. For example, the reference plane can be defined and used to estimate illumination at any point or plane of interest. The reference position may be any position which defines a position and orientation of the reference plane with respect to the mobile device, e.g. a plane of the display. The reference position may be used to define optical paths of incident light that reaches the reference plane, e.g. by reflection from the display or scattering in the environment of the mobile device. In a simple case, the reference position is defined intuitively by the way the user holds the mobile device in his hands.

The first image is generated by means of the first imaging unit. The first image depends on ambient light which is incident on the first imaging unit and is emitted from at least one ambient light source. For example, the ambient light may have contributions from just a single source such as the Sun, room lighting, or another light emitting device, etc., or more sources contribute to a combined ambient light level. In general, the ambient light may be incident on the first imaging unit from different optical paths, such as by direct illumination or by way of specular reflection off of the display of the mobile device.

A first light level is calculated from the first image. The first light level is indicative of a first fraction of the incident ambient light which illuminates the reference plane by means of a specular reflection of the incident ambient light at the display. In other words, the first light level is an indication of specularly reflected light illuminating the reference plane, e.g. the user's eye. As more sources of ambient light may contribute to the first image, the first light level is an indicator of the amount of specularly reflected light (reflected off of the display) in the first image.

A display parameter is adjusted depending on the first light level. For example, the display parameter determines a display brightness or a display color such as a color point or white balance.

In at least one embodiment a set of specular reflection vectors is determined by means of back tracing rays of incident ambient light connecting the reference plane and a set of reflection points. The reflection points are determined as corner points of a reflection area defined within a plane of the display, respectively.

For example, the reflection points determine a plane in the display. That may be the whole display or only part of it. The set of specular reflection vectors describe the range of incident angles of light contributing to specular reflection off of the reflection area defined by the reflection points. The vectors can be determined by means of descriptive geometry or back tracing ray or optical paths connecting the reference plane to the set of reflection points.

An illumination region in the first image is determined from the specular reflection vectors. Light from the illumination region illuminates the reference plane by means of specular reflection of the incident ambient light at the reflection area. For example, the determined set of specular reflection vectors can be used to demarcate a sub-region, i.e. illumination region, in the first image. Light that illuminates the illumination region of the first image may have been reflected by way of specular reflection at the reflection area, and, thus, can be used to determine the first light level. In fact, the first light level is calculated by integrating image values over the illumination region.

In at least one embodiment of the illumination region is determined by mapping the corner points into the first image and connecting the mapped corner points. For example, the set of specular reflection vectors can be used to associate each pixel in the first image with a corresponding angle in the field-of-view of the first imaging unit. Each specular reflection vector also corresponds to an angle in the field-of-view of the first imaging unit.

In at least one embodiment the specular reflection vectors are determined from relative coordinates of the corner points within a coordinate system and with respect to relative coordinates of the reference plane.

In at least one embodiment calculating the first light level involves determining a relative angle from the first image. The relative angle of the reference plane is defined with respect to the display, e.g. with respect to the reflection area.

In at least one embodiment the first imaging unit comprises a processing unit which is arranged to process the first image. Furthermore, the processing unit is arranged to determine the relative angle and/or other geometrical properties from the first image. The processing unit may be part of the first imaging unit such as a microprocessor or be a part of the mobile device such as a CPU, GPU or a dedicated unit for image processing.

In at least one embodiment the relative angle is determined by means of a facial recognition procedure which is executed by the processing unit. For example, the facial recognition procedure can be realized as an application or algorithm executed by the processing unit which is capable of identifying image content from an image of the imaging unit. For example, the facial recognition procedure may analyze the relative position, size, and/or shape of the reference plane, such as the user's eye. This can be considered one possible embodiment of the back tracing introduced above and allows for deducing the relative angle of the reference plane with respect to the display.

In at least one embodiment a relative distance between the reference plane and the display is determined. For example, the relative distance can be determined by means of the processing unit.

In at least one embodiment the relative coordinates of the reference plane with respect to the coordinate system are determined from the relative angle and the relative distance.

In at least one embodiment the mobile device comprises a second imaging unit. The second imaging unit faces away from the first imaging unit. For example, the first imaging unit is a backward facing detector or camera and the second imaging unit is a forward facing detector or camera, which exist in most modern mobile devices such as smartphones or tablets.

The method involves generating a second image by means of the second imaging unit. The second image depends on ambient light which is incident on the second imaging unit and is emitted from the at least one ambient light source. The terms "forward" and "backward" are interchangeable as they depend on which unit faces the reference plane, e.g. the user's eye, or not. However, one of the two units records an image of the reference plane, e.g. the user's eye, while the other unit records an image in a direction opposite to or facing away from the reference plane.

A second light level is calculated from the second image. For example, the second light level is indicative of a second fraction of the incident ambient light which illuminates the reference plane by means of reflection and/or scattering of the incident ambient light at the background. For example, the second light level is calculated by integrating image values of the second image over the whole, or parts of, the second image.

Finally, the display parameter is adjusted depending on the first and second light levels.

In at least one embodiment a third light level is determined. The third light level is indicative of a third a fraction of light emitted by the display and illuminating the reference plane. The display parameter is adjusted depending on the first and third light levels. The display parameter can also be adjusted depending on the first, second and third light levels. For example, third light level can be calculated from data of a display driver such as the display operating system or control system. Typically, the display driver sets the display to a certain brightness and/or color such that based on that knowledge the third light level can be calculated.

In at least one embodiment the display parameter is adjusted by weighting a contribution of the first, second and third light levels by a first, second, and third weighing factor, respectively. The weighting may recognize the impact of different environments, altitude of the sun, time of day, type of display, display parameter settings, etc.

In at least one embodiment the mobile device comprises an ambient light sensor. The method involves generating a first sensor signal depending on ambient light incident on the ambient light sensor. The ambient light is emitted from the at least one ambient light source. A fourth light level is determined from the first sensor signal. The display parameter is adjusted depending on the first sensor signal. Furthermore, the display parameter is adjusted depending on the fourth light level or depending on the fourth light level weighted by a fourth weighting factor. Finally, by adjusting the display parameter the display brightness is altered.

For example, the use of the imaging unit, such as a back-facing camera, may be complemented with the ambient light sensor by adding improved display control and allowing the system to discriminate between different light contributors. Typically an, ambient light sensor is present in most modern mobile devices such as smartphones or tablets. The first, second and third light levels can be used to correct or improve detection accuracy of the ambient light sensor. This may especially be beneficial if the ambient light sensor has a wide field-of-view and, thus, may be influenced by several light sources.

In at least one embodiment the mobile device comprises a color light sensor. Then the method involves generating a second sensor signal which depends on the color of the ambient color light incident on the light sensor and being emitted from the at least one ambient light source. Furthermore, a fifth light level is determined from the second sensor signal. The display parameter is adjusted depending on the second sensor signal. The display parameter is adjusted depending on the fifth light level or depending on the fifth light level weighted by a fifth weighting factor. Finally, by adjusting the display parameter the display color, white balance and/or color point is altered.

Often a color light sensor or a combined ambient light color sensor is present in most modern mobile devices such as smartphones. The first, second and third light levels can be used to correct or improve detection accuracy of the color light sensor. This may especially be beneficial if the ambient light sensor has a wide field-of-view and, thus, may be influenced by several light sources.

In at least one embodiment the mobile device comprises both the ambient light sensor and the color sensor. Thus, by adjusting the display parameter the display brightness, the display color, white balance and/or color point can be altered.

In at least one embodiment a computer program product comprises a computer readable medium. The computer readable medium comprises code for causing at least one programmable processor or computer to carry out a method for controlling a display parameter for mobile device as discussed above. A "computer-readable medium" includes but is not limited to read-only memory, Flash memory and a magnetic or optical storage medium. The instructions may be implemented as one or more software modules, which may be executed by themselves or in combination with other software.

In the following, the principle presented above is described in further detail with respect to drawings, in which exemplary embodiments are presented.

In the exemplary embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

DETAILED DESCRIPTION

Figure 1:
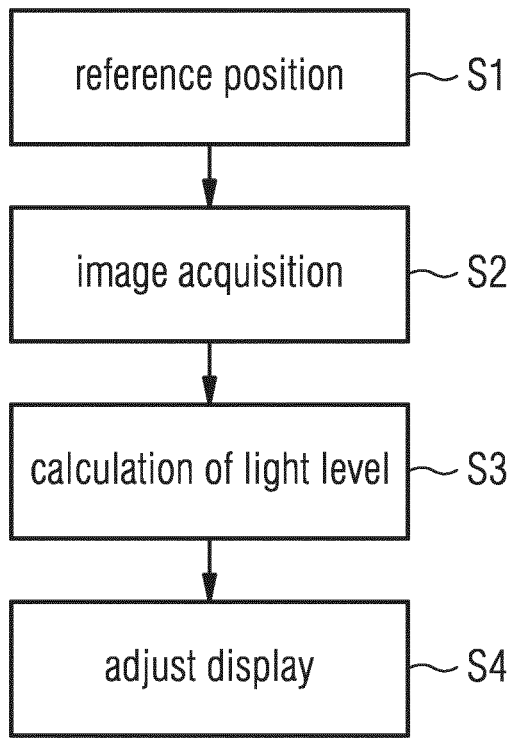
FIG. 1 shows an exemplary method for light detection of a specular reflection component.

FIG. 1 shows an exemplary method for light detection of a specular reflection component. The proposed method can be used alone, e.g. to determine a specular reflection component, or be complemented with further steps for light detection of additional components such as light emitted by the display itself or by other sources of ambient light (see FIGS. 5 and 6). The drawing shows an exemplary flowchart of steps involved in estimating a specular reflection component at a reference plane RP, such as the eye of the user of a mobile device 1. The mobile device 1 comprises a display 10 and at least a first imaging unit 21. The mobile device 1 may be any electronic device which has a display, such as a mobile phone, smartphone or tablet, etc. In this embodiment the imaging unit 21 is a camera unit having a light sensor such as a CCD or CMOS photo sensor, and optics such as an optical lens. The method discussed hereinafter may be implemented or executed by a processing unit such as a processor, control electronics and the like in the imaging unit itself or in the mobile device 1.

In a first step S1, the mobile device is brought into a position and orientation referred to as reference position hereinafter. The reference position may be any position and orientation of the mobile device with respect to a reference plane RP (typically a user's eye) and serves to define the geometry and coordinated for the calculations discussed below. Typically, the mobile device is held by a user (not shown) such that the display 10 and the first imaging unit 21 face towards the user's eye (represented by reference plane RP).

In a next step S2, a first image is generated by means of the first imaging unit 21. The image typically has contributions from several light sources. The further steps of the proposed method seek to extract or estimate the contribution of specular display screen reflections at the position of the reference plane RP.

A next step S3, involves calculating a first light level from the first image. Details will be discussed with respect to FIG. 2, however, briefly the first light level L1 is indicative of a fraction of incident light which illuminates the reference plane RP after specular reflection at the display 10.

In a final step S4, the first light level is used to adjust a display parameter DP, such as brightness and/or color, to adapt the display more accurately to its ambient lightning condition.

In one embodiment the display or glossy screen of a mobile device creates specular reflections of light from the screen. The first imaging unit 21 may, however, not capture that specular reflected light, i.e. the imaging unit only captures an image of what lies within its field of view. The image may contain e.g. an image of a can light or the sun etc., as well as an image of the user's face and eyes, but it may not completely capture the specular reflections from the screen. However, by knowing where the sources, e.g. can lights or other bright lights, are located, as well as where the user's eye is located, a sub-region within the field of view of the imaging unit can be calculated from which light reaches the user's eyes, and thereby estimate the contribution of screen glare to the user's viewing experience.

Figure 2:
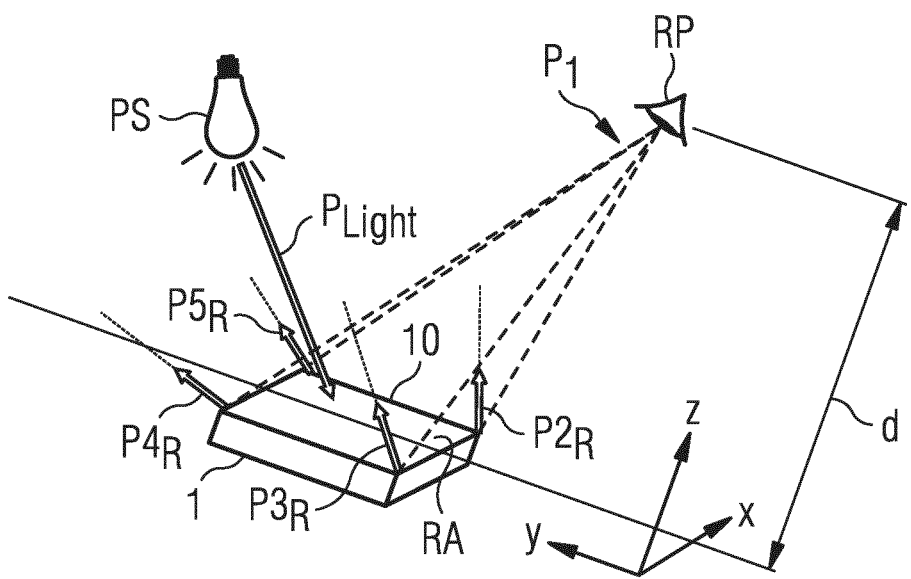
FIG. 2 shows an exemplary embodiment of method for calculating the first light level L1 of a specular reflection component.

FIG. 2 shows an exemplary embodiment of method for calculating the first light level L1 of a specular reflection component. The drawing illustrates a geometry of specular display screen reflections in a Cartesian coordinate system XYZ with coordinates (x, y, z). The origin of that coordinate system may be defined the first imaging unit 21, e.g. by an aperture of a back-facing camera, located at coordinates (x0, y0, z0)=(0, 0, 0). Vectors will be denoted as bold type hereinafter.

The reference plane RP, represented by a user's eye hereinafter, is located at a point P1 represented by coordinates xP1, yP1, zP1. Furthermore, a light source such as a point like source PS, e.g. the Sun or a ceiling can light, is located at position Plight. The display 11 from the mobile device 1 is arranged between the light source PS and the user's eye, located at P1, such that light striking the display could reach the user by specular reflection. The display area is constrained by reflection points P2, P3, P4 and P5, respectively. The reflection points P2, P3, P4, and P5 are determined as corner points of a reflection area RA defined within a plane of the display 10. Typically, the complete display area or even a larger front side of the mobile device 1 are reflective enough to support specular reflection.

The first imaging unit 21, e.g. a backward facing camera of the mobile device, generates one or more first images which are used for determining the first light level L1. The first images determine a relative location, e.g. a relative angle, of the user's eyes with respect to the display 10, e.g. the reflection area RA. The relative angle is determined by means of a facial recognition procedure which can be executed by a processing unit of the mobile device 1 (not shown). Facial recognition schemes are often common place in mobile devices as they are used for autofocus and adjusting exposure, as well as for red eye removal etc. The facial recognition procedure analyzes relative position, size, and/or shape of the reference plane, e.g. the user's eye.

In addition a relative distance between the reference plane RP and the display 10 is determined. The relative distance can be defined as the length of a surface normal of the display and point P1 represented by coordinates xP1, yP1, zP1. Thus, to a good approximation the relative distance is given by zP1. The relative distance can be determined from the first image as well. For example, a typical distance between the user's eyes can be estimated and introduced into the method as a known parameter. For example, typical pupillary distance for adults is around 54 to 68 mm, while measurements generally fall between 48 and 73 mm. This parameter may be predetermined or the user could choose from a table of values depending on whether he or she is an adult or child, male or female, etc. Or the parameter could be measured and then included into the mobile devices software.

The relative distance d can be acquired by analyzing the distance (in pixel positions) between the user's eyes in the first image(s) taken by the first imaging unit 21, e.g. the backward facing camera. Note that pixel positions directly map to angles in the camera. For example, one eye is centered on pixel position $(i_x, i_y)_{left}=(68, 43)$ and the other eye is found to be centered on pixel position $(i_x, i_y)_{right}=(220, 47)$. Furthermore, let the pixels be spaced apart by 3 µm (on the light sensor), and assume that the focal length of a camera lens is 5 mm. Then the angle $\Delta\alpha$ between the two eyes (assuming small angles) is given by:

$$\Delta\alpha \cong \frac{3 \,\mu m \sqrt{(105-47)^2 - (47-43)^2}}{5 \,mm} = 0.104 \text{ radians} \cong 6°.$$

Knowing the physical distance between the user's eyes, e.g. assumed to be about 64 mm, then the distance zP1 from the camera to the user's eyes is about:

$$zp1 = d \cong \frac{64 \,mm}{\Delta\alpha} = \frac{64 \,mm}{0.104 \text{ radians}} = 615 \,mm.$$

Once the relative angle $\Delta\alpha$ and distance zP1 are determined from the first image(s), relative coordinates of the reference plane, e.g. the user's eyes, can be determined. These will be represented by point P1 introduced above having Cartesian coordinates (xP1, yP1, zP1).

Specular reflection vectors P2r, P3r, P4r, P5r can be calculated from points P2, P3, P4 and P5. For example, a reflection vector P4r is found by taking the difference between the Cartesian coordinates of points P4 and P1. The z component can be neglected as the corner points of the display are typically in the same plane as the imaging unit 21, i.e. at z=0, such that the four reflection points have coordinates (xP2, yP2, 0), (xP3, yP3, 0), (xP4, yP4, 0), and (xP5, yP5, 0), respectively.

Let the reflection point P4 and reference plane at P1 have the x, y, z Cartesian coordinates (xP4, yP4, zP4) and (xP1, yP1, zP1), respectively. Then P4R is given by:

$$P2r = (xp1-xp2)ax + (yp1-yp2)ay + (zp1-zp2)az,$$

wherein ax, ay, and az are unit direction vectors along the x, y, and z axis of the coordinate system XYZ. P4R can be normalized to a unit vector as $$P2r = \frac{[(xp1-xp2)ax + (yp1-yp2)ay + (zp1-zp2)az]}{\sqrt{[(xp1-xp2)^2 + (yp1-yp2)^2 + (zp1-zp2)^2]}}.$$

Similarly, normalized specular reflection vectors P3r, P4r, P5r can be determined and yield:

$$P3r = \frac{[(xp1-xp3)ax + (yp1-yp3)ay + (zp1-zp3)az]}{\sqrt{[(xp1-xp3)^2 + (yp1-yp3)^2 + (zp1-zp3)^2]}}$$

$$P4r = \frac{[(xp1-xp4)ax + (yp1-yp4)ay + (zp1-zp4)az]}{\sqrt{[(xp1-xp4)^2 + (yp1-yp4)^2 + (zp1-zp4)^2]}}$$

$$P5r = \frac{[(xp1-xp5)ax + (yp1-yp5)ay + (zp1-zp5)az]}{\sqrt{[(xp1-xp5)^2 + (yp1-yp5)^2 + (zp1-zp5)^2]}}.$$

The relative coordinates of points P1, P2, P3, P4, and P5 are known from the analysis of the first image discussed above. Furthermore, the distance zp1 has also been determined. Thus, the specular reflection vectors P2r, P3r, P4r, P5r can also be determined. As a consequence each pixel in the first image maps to an angle in its field-of-view. Each vector P2r, P3r, P4r, P5r also corresponds to an angle in the first image, i.e. in the camera's field-of-view. This angle can be computed or mapped in various ways, e.g. in a polar angle system having a zenith angle θ and an azimuth angle φ. The polar angles associated with P2r for example is given by:

$$\theta = \arctan\left(\frac{\sqrt{xp1-xp2)^2 + (yp1-yp2)^2}}{(zp1-zp2)^2}\right)$$

and $$\varphi = \arctan\left(\frac{(yp1-yp2)}{(xp1-xp2)}\right),$$

where θ is the zenith angle and φ is the azimuth angle. With this knowledge the reflection points P2, P3, P4, P5, i.e. the corner points of the reflection area defined within a plane of the display, can be mapped into the first image(s) and connected with lines. This then defines the region, within the first image, where light can reach the reference plane RP, e.g. user's eyes, via specular reflection or "glare" from the display (illumination region). By integrating the energy contained in this region the total glare energy reaching the user's eyes can be estimated as a first light level L1. In turn, the first light level L1 can be used to adjust one or more display parameters DP, such as display brightness and/or color.

Figure 3:
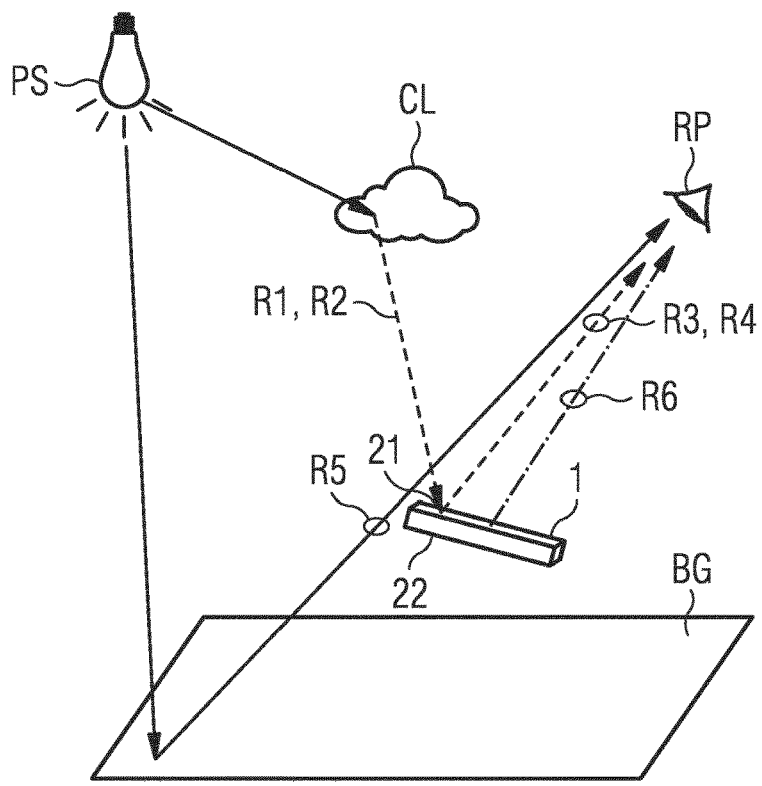
FIG. 3 shows exemplary light contributors to a viewer's apparent field-of-view when using a mobile device.

FIG. 3 shows exemplary light contributors to a viewer's apparent field-of-view when using a mobile device. While specular reflections can play an important role in degrading the viewer's experience, other light paths also play a role. The drawing shows a light source PS such as the sun or a light bulb. Light may reach a user's eye by travelling one of various optical paths.

Figure 7:
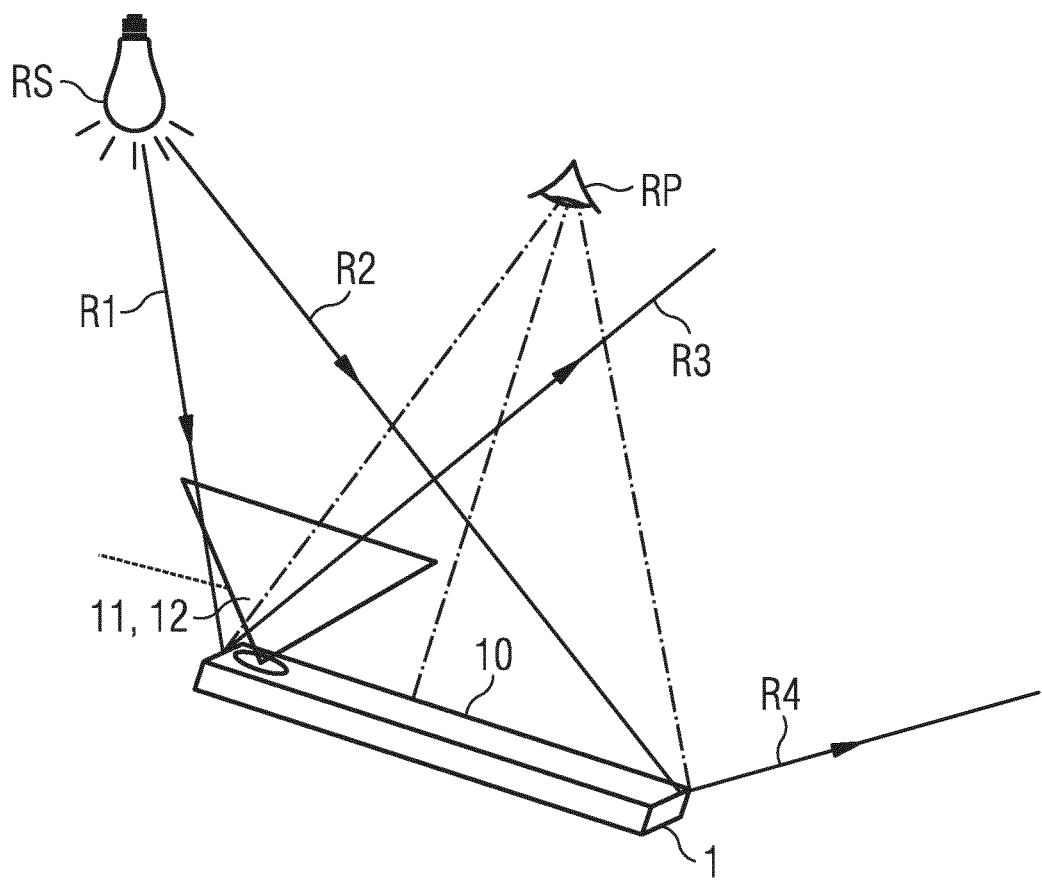
FIG. 7 shows exemplary specular reflection paths at the display of a mobile device.

A first optical path concerns specular reflection as discussed above with respect to FIGS. 1 and 2. As shown in FIG. 7 light may directly strike the glossy display as rays R1 and R2. These rays are specularly reflected from the display as rays R3 and R4, respectively, and may or may not contribute to light being incident on the user's eye. In a similar way, light may be scattered by a cloud CL, blue sky (Rayleigh scattering), or by room ceiling before striking the display as rays R1, R2 and reflected by specular reflection as rays R3 and R4.

A second optical path is established via a background BG such as the ground or other objects located in close location of the user. For example, the background comprises all objects in the user's apparent image. Light may be reflected and/or scattered when it strikes the background via ray R5. Due to reflection and/or scattering light may then illuminate the user's eye by traversing along the second optical path as ray R6. Note that this source of illumination does not involve reflection at the display of the mobile device but rather constitutes background or ambient light effecting the user's peripheral vision. An E Ink display also reflects significant diffuse light, in addition to the specular reflection of the display. A third optical path concerns light which is emitted by the display itself. Such light may illuminate the user's eye via ray R6.

Typically not all reflected rays reach the user's eye. That is to say, light rays are incident on the display from various angles, and they are specularly reflected in accordance with the law of reflection where the angle of reflection equals the angle of incidence (the exception being if the surface also has diffuse reflectance such as E-ink, in which case each incident light ray gets scattered in many directions). Of the reflected rays, many do not reach the user's eye, but some do reach the user's eye, depending upon angular geometry. The calculated light levels are indicative of what portion of the incident light reaches the user's eyes, e.g. via specular reflection.

A plurality of sensors may be employed to more accurately estimate the total light reaching the viewers eyes. By employing a judicious mix of forward and backward looking sensors, the mobile display system can measure background light (e.g. using a wide angle forward looking sensor such as an ALS device), specularly reflected light from the display (using the methods outlined above with respect to FIGS. 1 and 2 which can optionally utilize a back facing camera), and diffusely reflected light from the display (e.g. using a wide angle backwards looking ALS sensor). In addition, the light that is intentionally emitted by the display itself can be estimated, by virtue of the fact that the mobile display driver software is in direct control of the display 10. Judicious use of this information allows more accurate estimation of the light reaching the viewers eyes, which may be the next best thing to, e.g., having forward looking sensors placed at the location of the viewer's eyes, and perhaps communicating the sensed light back to the display device via, say, Bluetooth technology.

Figure 4:
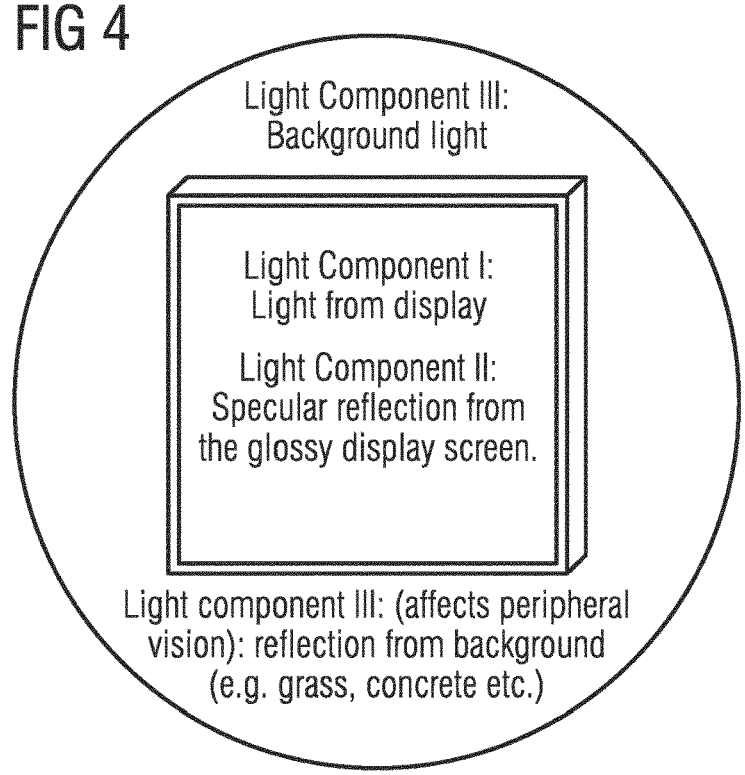
FIG. 4 shows exemplary light contributors to a viewer's apparent field-of-view as seen by the user.

FIG. 4 shows exemplary light contributors to a viewer's apparent field-of-view as seen by the user. As discussed above there are three main types of light sources that contribute to illumination at the user's eye (or reference plane in general). The drawing illustrates that these three sources may be seen by the user from different apparent angles.

A first light contributor comes from light being emitted by the display 10. A second light contributor stems from light which is specularly reflected at the glossy display screen. This component may best be captured by a backward looking ambient light sensor 11 and/or backward facing camera 21 as discussed above. The third light contributor originates from background or ambient light sources such as reflection from the background, e.g. grass, concrete etc. and can be captured by a forward looking imaging unit 22 or sensor. The third light contributor affects mainly the user's peripheral vision whereas the first and second light contributors predominantly affect the central vision of the user.

The relative impact of the different light contributors not only depends on the light source but also the type of display. For example, the display face could also have a diffuse (non-specular) reflection component. A good example of that would be a display using E Ink technology. If an end application is white-balance/color corrections of the display, then screen "glare" potentially plays an even more important role since color perception effects are dominated by a relatively narrow cone of view (~10°).

Figure 5:
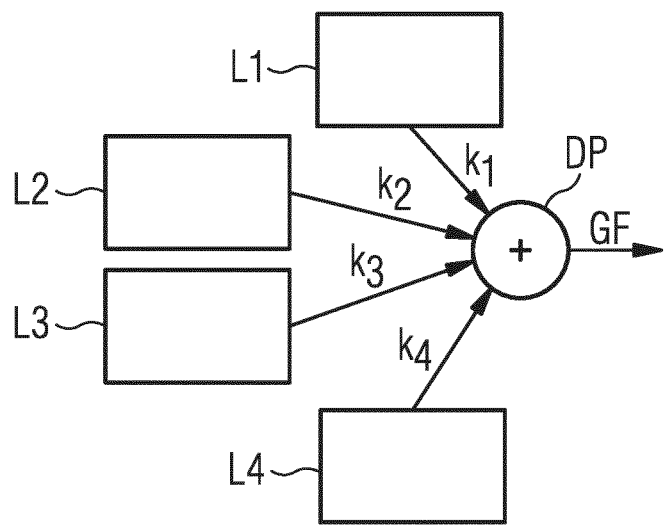
FIG. 5 shows an exemplary weighting method for ambient light sensing.

FIG. 5 shows an exemplary weighting method for ambient light sensing. In order to achieve a more comprehensive estimation of what the viewer's visual experience actually is and to improve control the display's brightness and/or color/white balance, the several light contributors discussed above can be accounted for. The different contributions to the user's perception can be included by using information provided by the various sensor and imaging units embedded in the mobile device.

In this example embodiment the mobile device 1 comprises the first imaging unit 21, e.g. a backward facing camera. A second imaging unit 22 is also embedded into the mobile device. For example, the second imaging unit 22 is a forward facing camera which is typically built in modern mobile devices such as smartphones or tablets. Basically, the first and second imaging units 21, 22 detect light or images from two opposing directions. Finally, also an ambient light sensor 11 is embedded into the mobile device 1. Typically, such a sensor is already implemented in the mobile device as well and is equipped with wide angle optics.

The first imaging unit 21 collects an image of light sources that may contribute to specularly reflected light. The image is used to determine the first light level L1 as discussed above and detailed with respect to FIGS. 1 and 2. The second imaging unit 22 collects one or more second images of background or ambient light being incident from the direction of the apparent field-of-view of the user. The images collected give rise to a second light level L2, e.g. measured by integrating the image values from one or more images over a defined field-of-view in the image.

A third light level L3 indicates an amount of light emitted by the display 10 itself. This light level is calculated by the display operating system or control system. Finally, the ambient light sensor provides a sensor signal that is indicative of ambient light emitted from a wide field-of-view in the backward facing direction. The sensor signal gives rise to a fourth light level L4. All light levels are luminance or scalar quantities, for example. A set of weighting factors k1, k2, k3 and k4 are used to weigh the individual contributions of the first, second, third and fourth light levels L1, L2, L3, and L4. The weighting factors have values between 0 and 1, for example.

In an ambient light (or ALS) application of the mobile device that strives to control only the display brightness there will be more emphasis on peripheral vision of the user, i.e. the wide angle forward looking ambient light sensor 11 would emulate the viewer's peripheral vision that is outside the angular areas subtended by the display 10. Thus, the fourth light level L4 is more significant resulting in a high weighting factor k4. Emission by the display 10 is less significant and, thus, contribution of the third light level L3 is less significant. Consequently, weighting factor k3 is set to a low value. The impact of scattered background and ambient light, i.e. the second light level depends on the type of display. Typically, the contribution is less significant (low weighting factor k2) unless the display is an E ink display. The first light level L1 indicated by the first light level (screen glare) usually is constant depending on a Fresnel reflection coefficient of the display. The first light level L1 is estimated using the method discussed above (see FIGS. 1 and 2).

The actual values can be set to a predetermined set of values, e.g. for indoor or outdoor use modelling typical lighting conditions, or they can be dynamically set depending on the actual lighting situation. The light levels multiplied by their respective weighting factors k1, k2, k3 and k4 can be summed to yield a display parameter DP. For example, the display parameter DP determines a gain factor GF for adjusting the display brightness. Typically, the gain factor has values in the range of $0 < GF \leq 1$.

Figure 6:
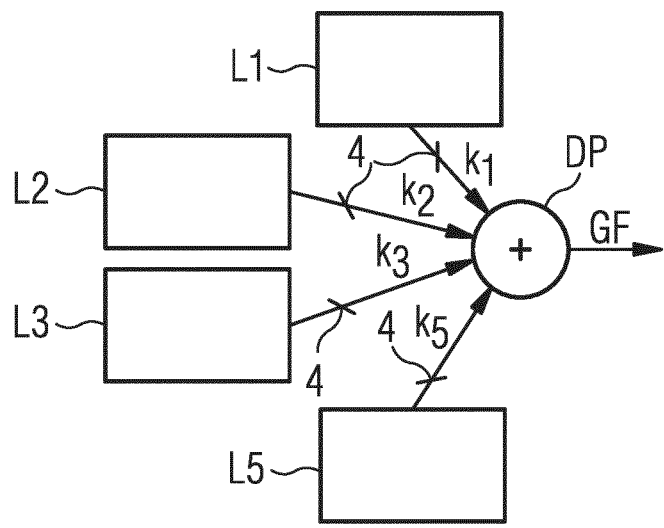
FIG. 6 shows an exemplary weighting method for color light sensing.

FIG. 6 shows an exemplary weighting method for color light sensing. The drawing shows a converse situation when a color/white balance control is considered. In addition, or instead of, the ambient light sensor 11, a color sensor 12 is embedded into the mobile device 1. The color light sensor 12 provides a sensor signal that is indicative of a color of ambient light emitted from a wide field-of-view in the backward facing direction. The sensor signal gives rise to a fifth light level L5. All light levels are CRGB or CXYZ vectors with four color components of a defined color space, for example. A fifth weighting factor k5 is used to weigh the contributions of the fifth light level L5. The weighting factor k5 may have values between 0 and 1, for example.

The term "C" in CRGB or CXYZ designates a light level known as the clear channel, that has no color filters. Although not providing color information, the clear channel data is used in many color sensors, via subsequent calculations, to help estimate and suppress residual infra-red energy that can penetrate through the RGB, or XYZ, filters, as these color filters are not always perfect at excluding infra-red energy.

In a color detection application of the mobile device that strives to control only the display color, color point or white-balance there will be more emphasis on the central vision as the human eye is much more significant here. In this application, more weight may be put on the estimated screen glare and the color components of that glare, such as the Fresnel reflection from a blue sky off the screen. This glare mixes with the colored images displayed on the display screen and can have a profound effect on the viewer experience. FIG. 6 shows the sensor light may be broken down into multiple categories, e.g. using forward and backward looking sensors to estimate a color content and intensity of the screen glare (specular screen reflections) reaching the viewer's eyes. This information can be used together in a similar way as discussed in FIG. 5 so as to make display brightness and/or color/white balance corrections.

The fifth light level L5, i.e. color of ambient light detected by color sensor 12 is less significant resulting in a lower weighting factor k5 as it predominantly affects peripheral vision. Emission by the display 10 is more significant as it lies in the central field-of-view and, thus, contribution of the third light level L3 is more significant. Consequently, weighting factor k3 is set to a higher value. The impact of scattered background and ambient light, i.e. the second light level depends on the type of display. Typically, the contribution is less significant (low weighting factor k2) unless the display is an E ink display. The first light level L1 (screen glare) usually is constant depending on a Fresnel coefficient of the display but may have a significant contribution, i.e. high weighting factor k1. The first light level L1 is estimated using the method discussed above (see FIGS. 1 and 2).

The invention claimed is:

1. A method for controlling a display parameter of a mobile device, the mobile device comprising a display and a first imaging unit, the method comprising the steps of:
    positioning and orienting the display with respect to a reference plane located at a reference position, such that the first imaging unit faces towards the reference plane,
    determining a set of specular reflection vectors by means of back-tracing rays of incident ambient light connecting the reference plane and a set of reflection points, respectively, wherein the reflection points are determined as corner points of a reflection area defined within a plane of the display, respectively,
    generating a first image by means of the first imaging unit, wherein the first image depends on ambient light incident on the first imaging unit and emitted from at least one ambient light source,
    determining from the specular reflection vectors an illumination region within the first image from which incident ambient light illuminates the reference plane by means of specular reflection of the incident ambient light at the display,
    calculating a first light level from the first image by integrating image values over the illumination region, wherein the first light level is indicative of a first fraction of the incident ambient light which illuminates the reference plane by means of specular reflection of the incident ambient light at the display, and
    adjusting the display parameter depending on the first light level.

2. The method according to claim 1, wherein the illumination region is determined by mapping the corner points into the first image and connecting the mapped corner points.

3. The method according to claim 1, wherein the specular reflection vectors are determined from relative coordinates of the corner points within a coordinate system and with respect to relative coordinates.

4. The method according to claim 1, wherein calculating the first light level involves determining from the first image a relative angle of the reference plane with respect to the display.

5. The method according to claim 4, wherein the first imaging unit comprises a processing unit which is arranged to process the first image and to determine the relative angle from the first image.

6. The method according to claim 5, wherein the relative angle is determined by means of a facial recognition procedure executed by the processing unit.

7. The method according to claim 1, wherein a relative distance between the reference plane and the display is determined.

8. The method according to claim 3, wherein the relative coordinates of the reference plane with respect to the coordinate system are determined from the relative angle and the relative distance.

9. A method for controlling a display parameter of a mobile device, the mobile device comprising a display, a first imaging unit, and a second imaging unit facing away from the first imaging unit, the method comprising the steps of:
    positioning and orienting the display with respect to a reference plane located at a reference position, such that the first imaging unit faces towards the reference plane,
    generating a first image by means of the first imaging unit, wherein the first image depends on ambient light incident on the first imaging unit and emitted from at least one ambient light source,
    calculating a first light level from the first image, wherein the first light level is indicative of a first fraction of the incident ambient light which illuminates the reference plane by means of specular reflection of the incident ambient light at the display,
    generating a second image by means of the second imaging unit, wherein the second image depends on ambient light incident on the second imaging unit and emitted from the at least one ambient light source,
    calculating a second light level from the second image, wherein the second light level is indicative of a second fraction of the incident ambient light which illuminates the reference plane by means of reflection and/or scattering of the incident ambient light at a background, and
    adjusting the display parameter depending on the first and second light levels.

10. The method according to claim 9, comprising the further steps of:
    determining a third light level, wherein the third light level is indicative of a third fraction of light emitted by the display and illuminating the reference plane, and
    adjusting the display parameter depending on the first and third light levels.

11. The method according to claim 10, wherein the display parameter is adjusted by weighting a contribution of the first, second and third light levels by a first, second, and third weighting factor, respectively.

12. The method according to claim 9, wherein the mobile device comprises an ambient light sensor, the method comprising the further steps of:
    generating a first sensor signal depending on ambient light incident on the ambient light sensor and emitted from the at least one ambient light source,
    determining a fourth light level from the first sensor signal,
    adjusting the display parameter depending on first sensor signal,
    adjusting the display parameter depending on the fourth light level or depending on the fourth light level weighted by a fourth weighting factor, and
    by adjusting the display parameter a display brightness is altered.

13. The method according to claim 9, wherein the mobile device comprises a color light sensor, the method comprising the further steps of:

generating a second sensor signal depending on a color of ambient light incident on the color light sensor and emitted from the at least one ambient light source, determining a fifth light level from the second sensor signal, adjusting the display parameter depending on the second sensor signal, adjusting the display parameter depending on the fifth light level or depending on the fifth light level weighted by a fifth weighting factor, and by adjusting the display parameter a display color, white balance and/or color point are altered.

14. A computer program product comprising a computer-readable medium comprising code for causing at least one computer to carry out a method according to claim 1.

15. A method for controlling a display parameter of a mobile device, the mobile device comprising a display, an ambient light sensor, a color light sensor, and a first imaging unit, the method comprising the steps of:

positioning and orienting the display with respect to a reference plane located at a reference position, such that the first imaging unit and the ambient light sensor face towards the reference plane, generating a first image by means of the first imaging unit, wherein the first image depends on ambient light incident on the first imaging unit and emitted from at least one ambient light source, calculating a first light level from the first image, wherein the first light level is indicative of a first fraction of the incident ambient light which illuminates the reference plane by means of specular reflection of the incident ambient light at the display, generating a sensor signal, wherein the sensor signal comprises:

a first sensor signal depending on ambient light incident on the ambient light sensor and emitted from the at least one ambient light source, or a second sensor signal depending on a color of ambient light incident on the color light sensor and emitted from the at least one ambient light source, determining a light level, wherein the light level comprises:

a fourth light level from the first sensor signal, or a fifth light level from the second sensor signal, and adjusting the display parameter, wherein the display parameter is adjusted:

depending on the first light level and the fourth light level, wherein by adjusting the display parameter a display brightness is altered, or depending on the first light level and the fifth light level, wherein by adjusting the display parameter a display color, white balance and/or color point are altered.

* * * * *